United States Patent
Ylläsjärvi et al.

(10) Patent No.: US 11,611,851 B2
(45) Date of Patent: Mar. 21, 2023

(54) LOCATION TRACKING OF ASSETS

(71) Applicant: HALTIAN OY, Oulu (FI)

(72) Inventors: Ville Ylläsjärvi, Oulu (FI); Teemu Vaattovaara, Oulu (FI); Marko Parttimaa, Oulu (FI); Jyrki Okkonen, Oulu (FI)

(73) Assignee: HALTIAN OY, Oulu (FI)

( * ) Notice: Subject to any disclaimer, the term of this patent is extended or adjusted under 35 U.S.C. 154(b) by 0 days.

(21) Appl. No.: 17/849,068

(22) Filed: Jun. 24, 2022

(65) Prior Publication Data

US 2022/0329978 A1 Oct. 13, 2022

Related U.S. Application Data

(62) Division of application No. 17/117,686, filed on Dec. 10, 2020, now Pat. No. 11,381,936.

(30) Foreign Application Priority Data

Dec. 11, 2019 (EP) ..................................... 19215276

(51) Int. Cl.
*H04W 4/029* (2018.01)
*H04W 84/18* (2009.01)

(52) U.S. Cl.
CPC ............ *H04W 4/029* (2018.02); *H04W 84/18* (2013.01)

(58) Field of Classification Search
CPC ..................................................... H04W 84/18
See application file for complete search history.

(56) References Cited

U.S. PATENT DOCUMENTS

| | | | |
|---|---|---|---|
| 10,028,105 B1 | 7/2018 | Swart | |
| 2009/0204354 A1 | 8/2009 | Davis et al. | |
| 2015/0105099 A1* | 4/2015 | Luo ........................ | H04W 64/00 455/456.1 |
| 2015/0355311 A1* | 12/2015 | O'Hagan ............... | H04W 4/029 340/539.13 |
| 2018/0084379 A1* | 3/2018 | Billau .................... | G01S 5/0295 |
| 2018/0261066 A1* | 9/2018 | Treacy ............... | G08B 21/0453 |
| 2021/0185482 A1 | 6/2021 | Ylläsjärvi | |

OTHER PUBLICATIONS

Extended EP Search Report for 19215276.7 dated May 28, 2020, 11 pages.

* cited by examiner

*Primary Examiner* — Qutbuddin Ghulamali
(74) *Attorney, Agent, or Firm* — Nixon & Vanderhye PC

(57) ABSTRACT

This document discloses a solution for event-triggered positioning of an asset tag. According to an aspect, the asset tag comprises: a first wireless communication circuitry configured to support a first wireless communication protocol of a decentralized wireless network; a second wireless communication circuitry configured to support a second wireless communication protocol different from the first wireless communication protocol; and at least one processor configured to perform event-triggered beacon signal transmissions by: pairing the asset tag with a wireless device and acquiring an identifier of the wireless device during the pairing; as a result of the pairing, triggering transmission of a beacon signal use the second wireless communication circuitry to transmit a beacon signal to position the asset tag; and generating payload data comprising information on said pairing and using the first wireless communication circuitry to transmit the payload data via at least one other asset tag of the decentralized wireless network to a server computer.

11 Claims, 9 Drawing Sheets

LOCATION TRACKING OF ASSETS

CROSS-REFERENCE TO RELATED APPLICATIONS

This application is a divisional of U.S. application Ser. No. 17/117,686 filed Dec. 10, 2020, which claims priority to European Patent Application No. 19215276.7 filed on Dec. 11, 2019, the entire contents of each of which are hereby incorporated herein by reference.

FIELD

Various embodiments described herein relate to the field of wireless communications and, particularly, to wireless location tracking solutions in a scenario where a number of tracked assets is high.

BACKGROUND

There exist several wireless location tracking solutions for tracking locations of assets provided with wireless communication capability. A tag may be attached to the asset, and the tag may operate according to a determined wireless communication protocol to enable the location tracking. Such communication protocols include Bluetooth®, radio frequency identification (RFID), and IEEE 802.11-based protocols. A location tracking system may employ one or more location tracking nodes provided, for example, at fixed and known positions and configured to track signals received from the assets or tags. Other location tracking solutions exist as well.

In some scenarios, the number of tags or tracked assets in an area is so high that it exceeds the capacity of the location tracking system. For example, the number of assets in a warehouse, manufacturing facility etc. may exceed several tens of thousands or even millions. In a situation where the tags broadcast location tracking beacons, the number of beacons may get the location tracking system congested, and the performance of the location tracking decreases.

BRIEF DESCRIPTION

Some aspects of the invention are defined by the independent claims.

Some embodiments of the invention are defined in the dependent claims.

The embodiments and features, if any, described in this specification that do not fall under the scope of the independent claims are to be interpreted as examples useful for understanding various embodiments of the invention. Some aspects of the disclosure are defined by the independent claims.

LIST OF DRAWINGS

Embodiments are described below, by way of example only, with reference to the accompanying drawings, in which FIG. 1 illustrates a system to which some embodiments of the invention may be applied;

DESCRIPTION OF EMBODIMENTS

The following embodiments are examples. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments. Furthermore, words "comprising" and "including" should be understood as not limiting the described embodiments to consist of only those features that have been mentioned and such embodiments may contain also features/structures that have not been specifically mentioned.

Figure 1:
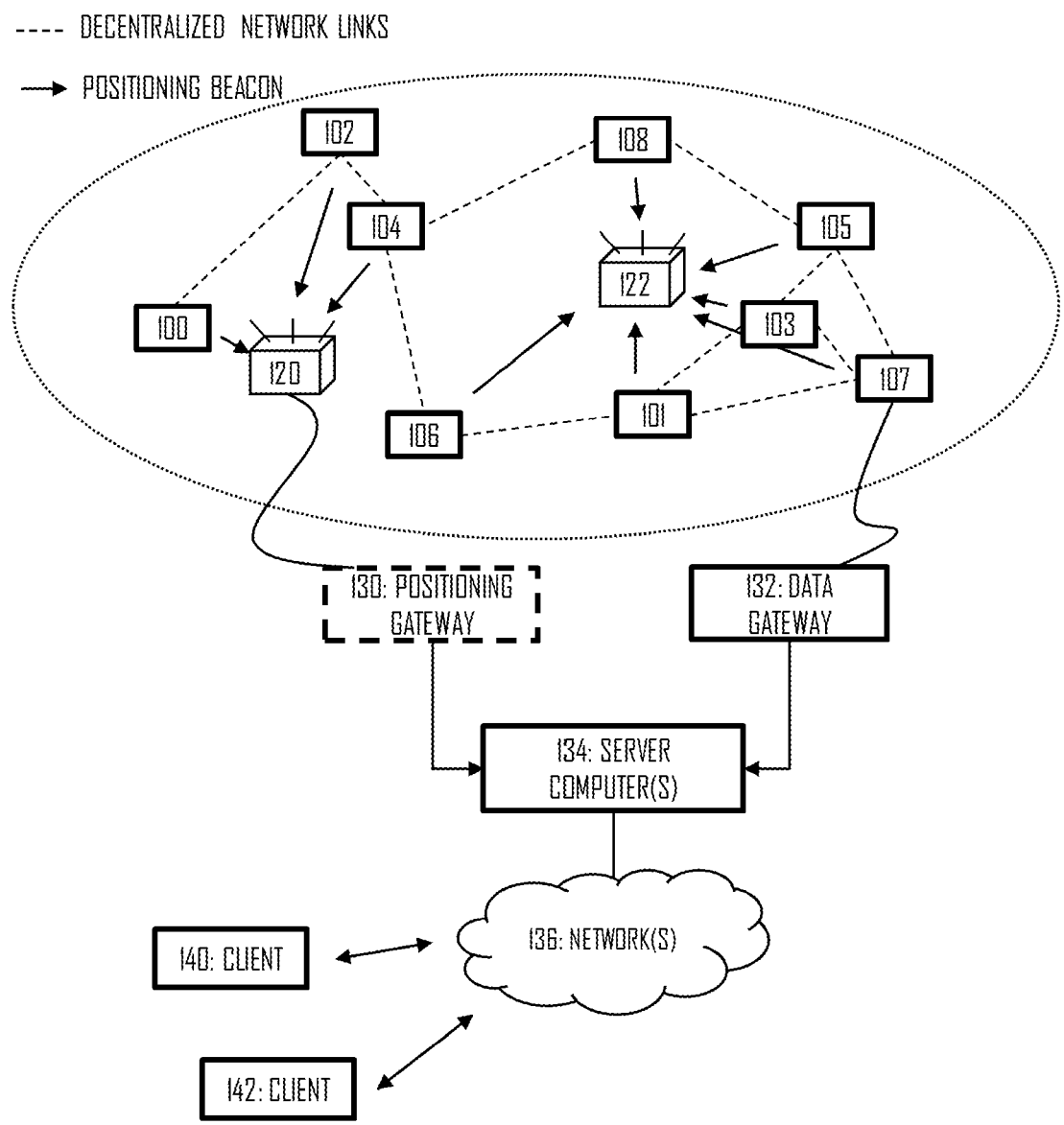

FIG. 1 illustrates an embodiment of a system for managing information on assets. The managing may include location tracking of the assets and, additionally, managing information acquired directly from the assets by an asset tag or a similar wireless communication device attached to each asset. The asset tag may be a small electronic device attached to the asset, e.g. made of printed electronics. The asset may be a product stored in a warehouse, equipment used in a facility, machinery employed in a manufacturing plant, etc. The asset tag may be a sensor tag comprising at least one sensor measuring the asset or an environment of the asset. Other purposes for the asset tags can be easily foreseen.

Referring to FIG. 1, the system comprises: a plurality of such asset tags 100 to 108, each asset tag associated with an asset. The asset tags are configured to establish a decentralized wireless network amongst the asset tags, and to route payload data via the decentralized wireless network according to a first wireless communication protocol. Radio links of the decentralized wireless network are illustrated by dashed lines between the asset tags in FIG. 1. The asset tags are further configured to enable location tracking of the assets by transmitting beacon signals according to a second wireless communication protocol different from the first wireless communication protocol. The beacon signals are illustrated by arrows directed away from the asset tags in FIG. 1. In reality, the beacon signals may be transmitted omni-directionally.

In an embodiment, the number of asset tags in the system is at least 1000, at least 10 000, at least 100 000, or at least 1 000 000.

In an embodiment, the number of asset tags in the system is at least 1000 per location tracking node, at least 10 000 per location tracking node, at least 100 000 per location tracking node, or at least 1 000 000 per location tracking node.

The payload data may comprise inventory data or presence data, and/or it may comprise sensor data, depending on the configuration of the asset tag. The payload data may describe the asset.

The system further comprises a positioning infrastructure comprising at least one location tracking node 120, 122 configured to receive said beacon signals, to determine location tracking information based on the received beacon signals, and to transmit the location tracking information to a server computer 134. The location tracking nodes 120, 122 may employ state-of-the-art positioning methods, such as measuring the received beacon signals. The location tracking nodes may, for example, measure a received signal strength indicator (RSSI) of a beacon signal received from an asset tag. When the transmission power of the beacon signal is fixed or otherwise known, attenuation between the asset tag and the location tracking node can be computed, and the attenuation is proportional to a distance between the asset tag and the location tracking node. As a consequence, the RSSI measurement may be used in the positioning. When multiple location tracking nodes measure the beacon signal and acquire the RSSI, triangulation indicates the location of the asset tag. In another scheme, the RSSI calculation is supported by multi-antenna processing in the location tracking node. The beacon signal may be received via an antenna array that enables angle-of-arrival computation for the beacon signal. The angle-of-arrival together with the RSSI computation provides a rather accurate estimate of the location of the asset tag without the need for the triangulation. Obviously, the triangulation may improve the estimate. The location tracking information may comprise an identifier of the asset tag indicated in the received beacon signal and the measured parameters such as the RSSI and the angle-of-arrival. In another embodiment, the location tracking node may compute an estimate of the location of the asset tag on the basis of the measured parameters and transmit the estimate as the location tracking information.

The system further comprises the server computer 134 configured to store a record for each asset, the record comprising the payload data received via the decentralized wireless network and further comprising location data based on the location tracking information received from the at least one location tracking node 120, 122.

In an embodiment, a data gateway node 132 may be connected to the decentralized wireless network to route the data between the asset tags and the server computer. A similar gateway node 130 may be provided between the location tracking node(s) 120, 122 and the server computer to route the location tracking information. The location tracking nodes 120, 122 may transmit the location tracking information wirelessly (e.g. via a Bluetooth (IEEE 802.15.1) or IEEE 802.11-based network) or via a wired connection (e.g. Ethernet). One or more networks may be provided along the route to the server computer. In an embodiment, the server computer 134 is accessible via the Internet.

One or more client devices 140, 142 may gain access to the server computer to read and/or write the records of the assets. The access may be realized via one or more networks 136, e.g. the Internet. The client devices 140, 142 may also be used to control the operation of the system, as described in some embodiments below.

The primary purpose of the positioning infrastructure is to enable the positioning efficiently. The location tracking nodes may be disposed at fixed locations in the premises where the location tracking is performed. A driving factor is cost-effective positioning of the location tracking nodes which means that the density of the location tracking nodes is such that accurate positioning accuracy is achieved in the premises. This means that the wireless communication capacity of the location tracking nodes is not typically a factor. As a consequence, the positioning infrastructure may have more limited capacity than the decentralized wireless network in terms of a maximum number of simultaneously communicating devices. On the other hand, the positioning infrastructure may employ, by virtue of fixed positions of the location tracking node, more accurate positioning accuracy than what is possible for the decentralized wireless network. In the decentralized wireless network, there is not fixed infrastructure and the nodes formed by the asset tags may be mobile. This mobility of nodes may render positioning inaccurate in the decentralized wireless network. On the other hand, the capacity of the decentralized wireless network formed by the asset tags scales relatively freely.

In an embodiment, the decentralized wireless network is an ad hoc wireless network.

In an embodiment, the decentralized wireless network is a wireless mesh network.

The wireless communication protocol employed in the decentralized wireless network may be proprietary or based on a standardized protocol such as IEEE 802.15 (e.g. ZigBee) or 802.11 for wireless mesh networks.

In an embodiment, the location tracking is based on Bluetooth® specifications, and the beacon signal is a Bluetooth beacon signal.

As described above, as the number of asset tags in the system increases, the capacity of the location tracking system may be exceeded which causes congestion in the location tracking, thereby degrading the performance of the location tracking. For example, Bluetooth specifies a limited number of channels for transmitting the beacon signals, and the channels may get congested. In particular, the beacon transmissions may be periodic broadcasts having no congestion control, e.g. channel sensing. As a consequence, multiple access tags may transmit the beacon signals simultaneously, thus congesting the available channels. As the capacity of the decentralized wireless network is more scalable, the location tracking may become a bottleneck for the performance of the system.

In order to control the congestion, the system of FIG. 1 comprises means for limiting transmissions of the beacon signals of the plurality of asset tags in a centralized manner such that simultaneous transmissions of the beacon signals are limited. Limiting the transmissions of the beacon signals reduces the congestion of the positioning infrastructure.

In an embodiment, the limiting is dynamic and controlled by the server computer 134 or another centralized controller. Embodiments are described in greater detail below.

The limiting may be made with respect to a default transmission policy of the beacon signals.

Figure 2:
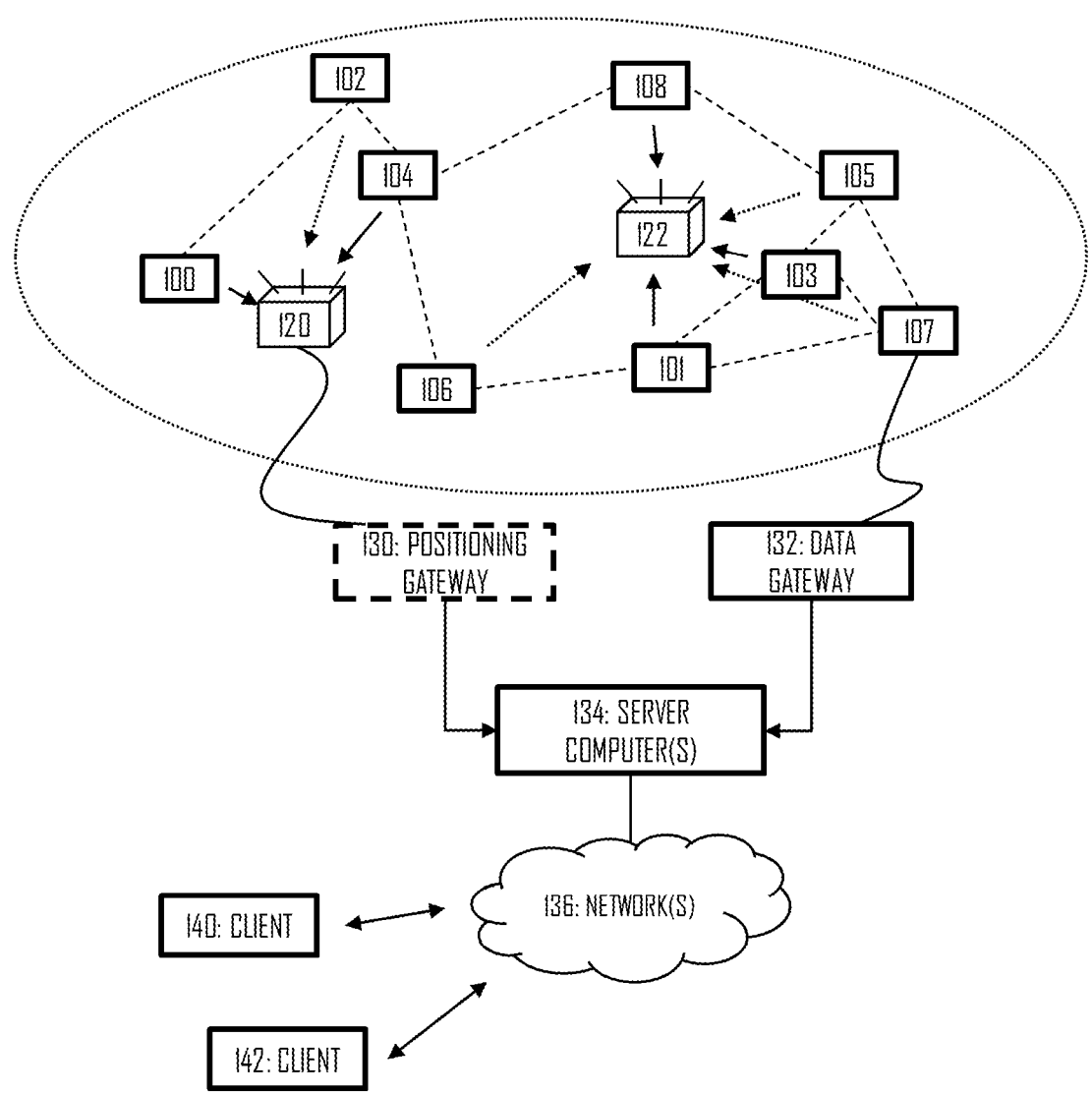
FIG. 2 illustrates an effect of manipulating transmission timing of beacon signals in the system of FIG. 1.

FIG. 2 illustrates the effect of limiting the beacon transmissions. With the limitation, the beacon transmissions are less frequent in the big picture and cause lower congestion to the channels of the second wireless communication protocol. The limiting may distribute the beacon signal transmissions in the time domain to more efficiently utilize the limited capacity of the positioning infrastructure. The limiting may be performed such that controlled variance is configured into beacon intervals employed by the different asset tags. The beacon intervals may further be selected such that the different beacon intervals are not multiples of one another. In yet another embodiment, pseudo-random variance is induced into the beacon intervals such that the beacon intervals configured to the different asset tags are pseudo-random.

Figure 3:
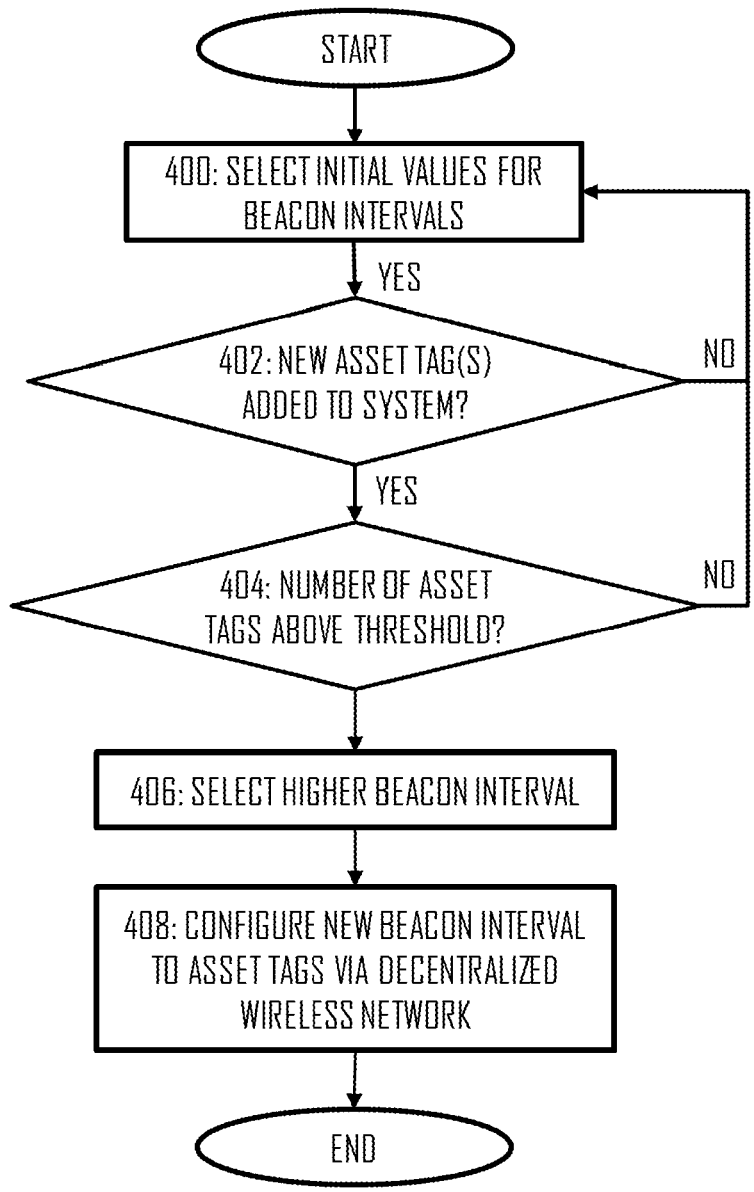
FIG. 3 illustrates a process for adapting beacon transmission timing rules to a number of asset tags in the system.

In an embodiment, the limiting is performed such that the length of the beacon interval is proportional to the number of asset tags in the system. The more asset tags are provided in the system, the longer is the beacon interval configured to the asset tags. The limiting means may employ a mapping table mapping the number of asset tags to the length of the beacon interval. FIG. 3 illustrates an example of such a process. In this embodiment, the limiting means may be comprised in a controller controlling the beaconing of the asset tags, e.g. the server computer.

Referring to FIG. 3, the controller may select initial values for the beacon intervals of the asset tags, and the initial values may be configured to the asset tags. The asset tags may then employ these beacon intervals in the transmission of beacon signals. As new asset tags are added to the system (block 402), the controller may monitor the total number of asset tags in the system with respect to a threshold. The threshold may determine a level where the beacon interval is considered so short that the capacity of the positioning infrastructure becomes jeopardized. The threshold level may depend on the number of location tracking nodes, the specifications and channel capacity of the second communication protocol etc. In an embodiment, the threshold is set to such a value that when there is at least 1000 asset tags per location tracking node, the threshold is exceeded. The threshold may be set to a value other than the 1000 asset tags per location tracking node, e.g. it may be 1500, 10 000, or 50 000 asset tags per location tracking node, for example. From another perspective, the threshold may be set to a total number of asset tags such that the number of location tracking nodes is not considered by the threshold. There are various ways to set the threshold to reach the above-described technical effect.

Upon detecting that the number of asset tags exceeds the threshold (block 404), the controller may select a higher beacon interval (block 406) and configure the new beacon interval to the asset tags. The configuration may be carried out by transmitting a control message to the asset tags via the decentralized wireless network (block 408). As a consequence, the new beacon interval may be programmed to the asset tags in a dynamic manner. In a similar manner, as the number of asset tags in the system decreases, the controller may select a shorter beacon interval to improve the positioning accuracy. In this manner, dynamic control may be achieved and the capacity of the positioning infrastructure may be affected.

In another embodiment, the location tracking nodes may be configured to monitor their capacity or channel congestion and report to the controller at least when the capacity or the channel congestion reaches a stage where the performance is jeopardized. Upon receiving such a notification from a location tracking node, the controller may carry out the limiting. In an embodiment, the controller is configured to determine the location of the reporting location tracking node, to check the records and determine asset tags located in the same area with the location tracking node, and perform the limiting to such asset tags located in that area. Asset tags located in other areas may be excluded from said limiting, thereby focusing the limitation to the area where the problem is detected.

In another embodiment, the limiting means are configured to control event-based beacon signal transmissions instead of periodic. Such event-based beacon signal transmission reduces the power consumption of the asset tags and may be useful when real-time positioning of the asset tags is not required, e.g. when the assets are relatively static. FIGS. 4 to 9 illustrate embodiments of the event-based beacon signal transmissions.

Figure 4:
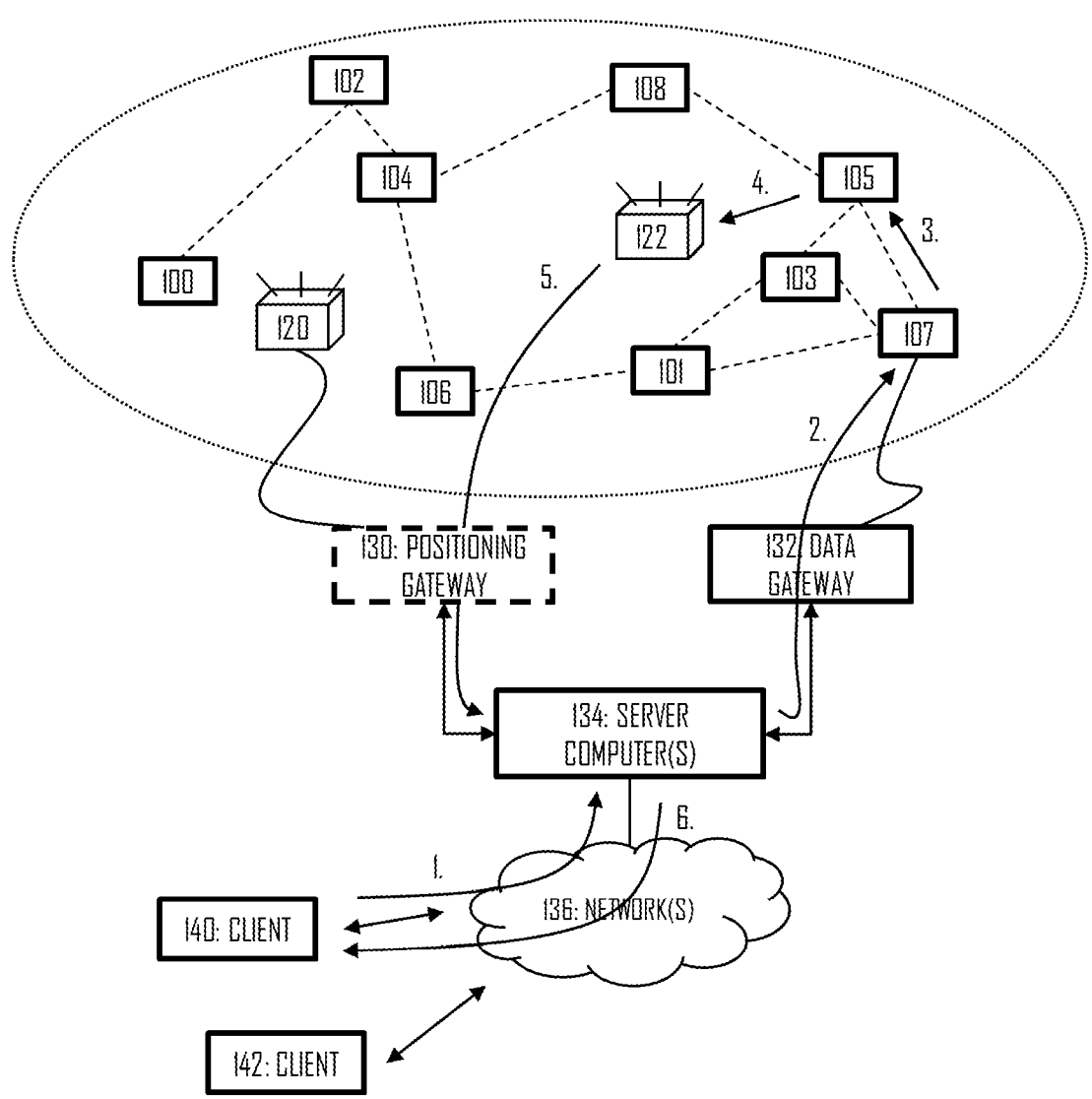
FIGS. 4 and 5 illustrate an embodiment of an event-triggered transmission of a beacon signal.
Figure 5:
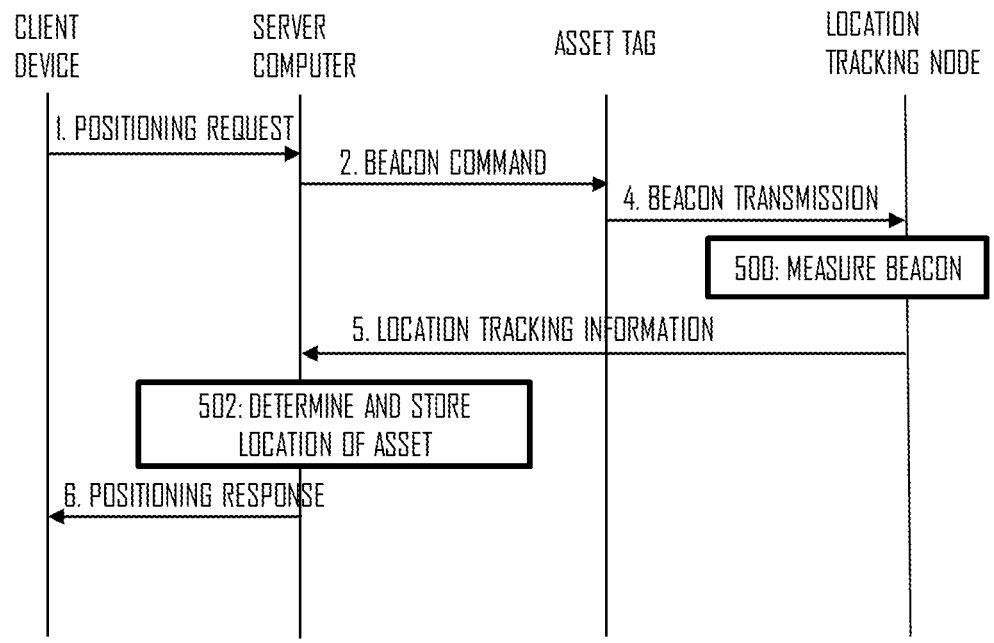

FIGS. 4 and 5 illustrate an embodiment where the positioning is triggered by a positioning request from a client device. An operator of the client device may need to know a location of a certain asset and, as a consequence, the operator may use the client device to access the server computer. In step 1. the client device may send a request for positioning the asset. The request may indicate the asset and the server computer may access a record of the asset and determine an identifier of an asset tag associated with the asset in the record. Then, the server computer may send a command to transmit a beacon signal to the asset tag via the decentralized wireless network (step 2.). Upon receiving the command via the network of asset tags in step 2. (routing the command via one or more asset tags of the network is illustrated by 3. in FIG. 4), the asset tag transmits one or more beacon signals in step 4. A determined number of beacon signals may be transmitted to ensure sufficient positioning accuracy, and the number of beacon signals may be preconfigured to the asset tag. While transmitting the beacon signals, the location tracking node(s) scan for beacon signal transmissions. Upon detecting the beacon signal(s) in step 4. the location tracking node measures (step 500) the beacon(s) and generates the location tracking information and sends the location tracking information in step 5. to the server computer. Upon receiving the location tracking information, the server computer determines the location of the asset tag and stores/updates the location of the asset in the record (step 502). Then, the server computer may respond to the positioning request by transmitting a positioning response to the client device (step 6.).

The server computer may, in this embodiment and in the other embodiments described herein, determine the location of the asset on the basis of the location tracking information received from the location tracking node(s) that have detected the beacon signal and, additionally, pre-known locations of the location tracking node(s). The location tracking node(s) may serve as anchor points for the location tracking, and their locations may be fixed and known to the server, for example.

In an embodiment, the beacon signal transmission is subject to detecting a determined event in the sensor device. The event may be internal in the sense that it differs from the external command described above in connection with FIGS. 4 and 5. FIGS. 6 to 9 illustrate embodiments of such an event.

Figure 6:
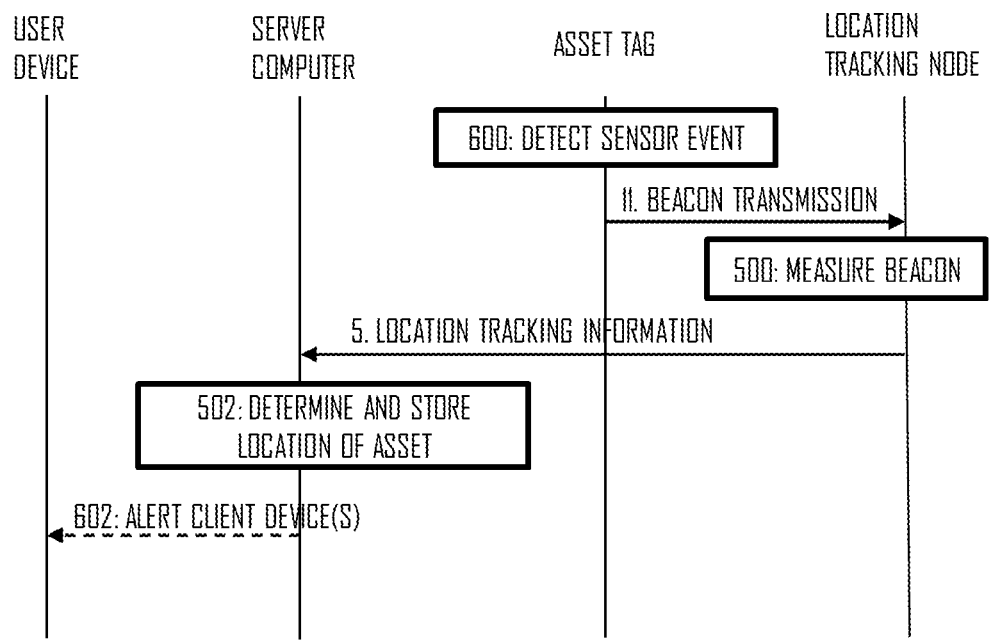
FIGS. 6 and 7 illustrate another embodiment of an event-triggered transmission of a beacon signal.
Figure 7:
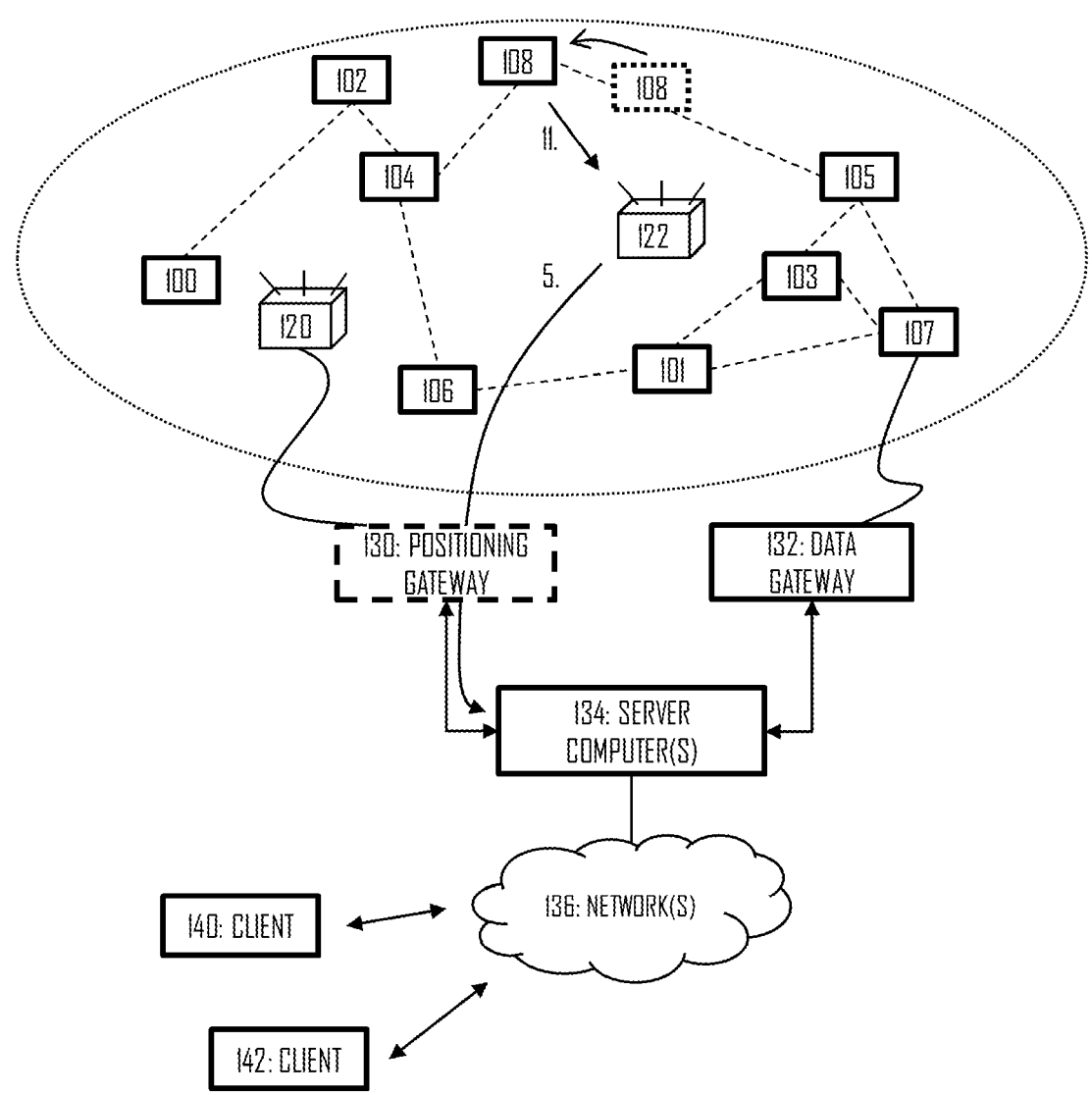

FIGS. 6 and 7 illustrate an embodiment where the asset tag comprises at least one sensor, and the determined event is detected from measurement data acquired with the at least one sensor. Referring to FIG. 6, such a sensor event is detected in block 600. The asset tag may be configured to link the sensor event to the transmission of the beacon signal and, as a consequence, the asset tag responds to the sensor event by transmitting the beacon signal in step 11. Thereafter, the process may proceed with steps 500, 5., and 502 in the above-described manner.

In an embodiment, the server computer may interpret the received location tracking information as more than mere location update. As a consequence, the reception of the location tracking information, the server computer may trigger another function than the location update. For example, the sensor device of the asset tag may be configured to sense the air and, upon detecting toxicity in the air, to transmit the beacon signal. The server computer may store in the record of the asset tag the function of the asset tag as well, and the server computer may interpret the reception of the location tracking information may in such a case as an alarm signal. Upon detecting the location of the asset tag sending the alarm, the server computer may determine whether or not there are users present in the area of the asset tag. The positioning infrastructure may be used to track user devices as well in the same manner as asset tags. Upon detecting user devices in the area, the server computer may transmit an alarm message to such user devices (step 602). Alternative preconfigured functions may be combined with the reception of the location tracking information and the sensor event.

FIG. 7 illustrates an embodiment where the sensor comprises a motion sensor, and the determined event is motion of the asset tag. Upon detecting motion of the asset tag, the asset tag may be configured to trigger the location update and start transmitting the beacon signal. Thereafter, the procedure may follow the principles of FIG. 6.

Figure 8:
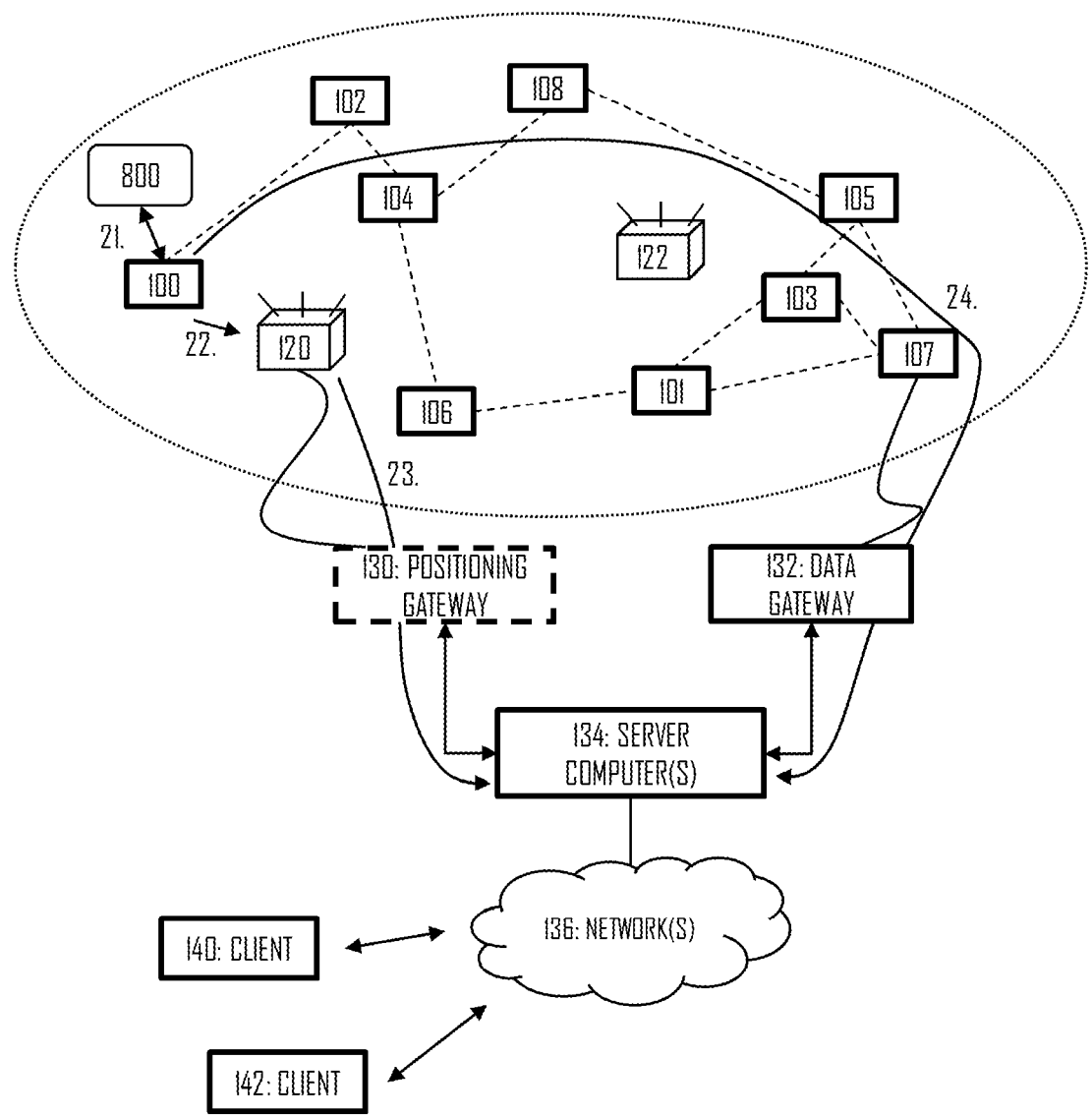
FIGS. 8 and 9 illustrate yet another embodiment of an event-triggered transmission of a beacon signal.
Figure 9:
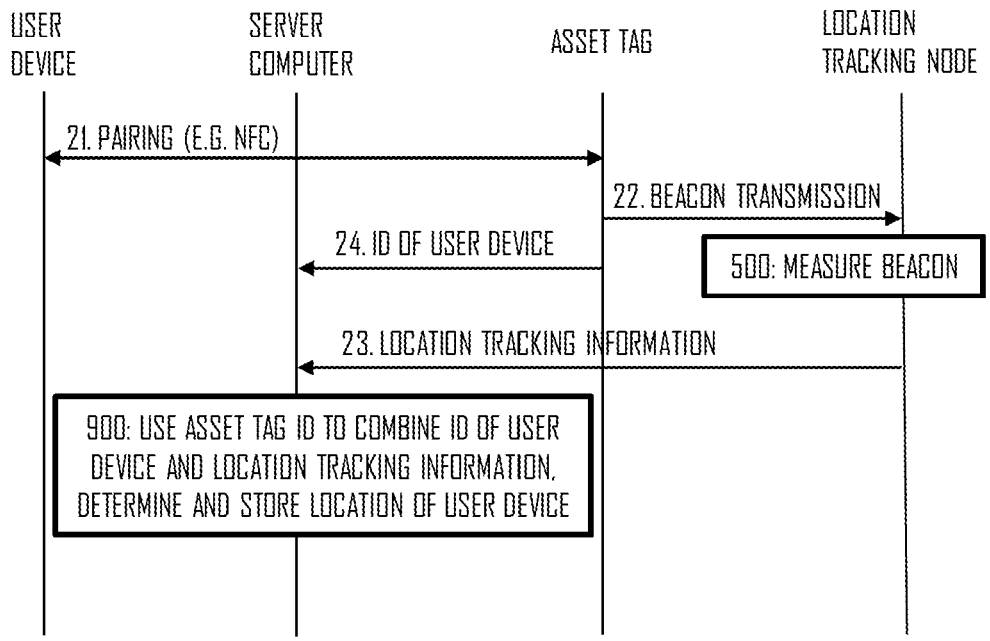

In an embodiment, the determined event triggering the transmission of the beacon signal in the asset tag is pairing the asset tag with a determined wireless device. During the pairing, the asset tag may receive an identifier of the determined wireless device, and the asset tag may, in addition to the transmission of the beacon signal, transmit the identifier to the server computer via the decentralized wireless network. FIGS. 8 and 9 illustrate such an embodiment.

Referring to FIG. 8, a user device 800 represents the wireless device, and the user device 800 may be one of the client devices 140, 142 or another device. The user device may be a mobile device carried by a user in the premises where the location tracking is performed. The user device may be configured to pair with the asset tags according to various criteria, e.g. the user may control the pairing or the pairing may be performed autonomously by the user device. The pairing may be carried out by using the above-described first communication protocol, the second communication protocol, or a different wireless communication protocol. An example of such a different wireless communication protocol is near-field communication (NFC) based on radio frequency identification (RFID) technology and ISO/IEC 18000-3 radio interface, for example.

Referring to FIGS. 8 and 9, upon pairing the user device 800 with an asset tag 100 (step 21.), the asset tag may detect the pairing and acquire an identifier of the user device during the pairing. As the pairing triggers the transmission of the beacon signal, the asset tag transmits the one or more beacon signals (Step 22), thus enabling positioning of the asset tag 100 and, at the same time, the user device because the user device is in the proximity of the asset tag 100. The location tracking node 120 detecting the beacon signals may then measure the beacon signals and transmit the location tracking information on the asset tag 100 to the server computer (step 23.), as described in the embodiments above. As described above, the identifier of the asset tag is delivered in step 23 to the server computer. Additionally, the asset tag 100 may transmit the identifier of the user device to the server computer through the decentralized wireless network (step 24). The identifier may be transmitted in a message that comprises an identifier or an address of the asset tag 100 as well, e.g. as a source or a transmitter of the message. The server computer may then use the identifier of the asset tag to combine the identifier of the user device and the location tracking information received via the different routes (step 900). As a consequence, the server computer may update a record of the user device and/or the asset tag with the location of the user device and/or the asset tag and the information on the pairing between the user device and the asset tag.

Figure 10:
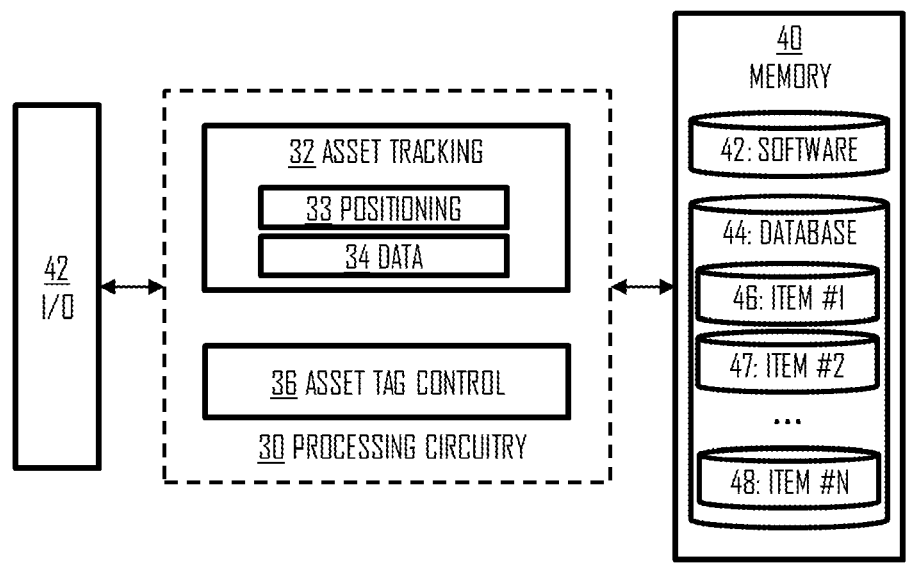
FIGS. 10 and 11 illustrate block diagrams of apparatuses according to some embodiments of the invention.

Above, the system and the devices of the system have been described. Now, let us describe some devices of the system in greater detail. FIG. 10 illustrates a diagram of the server computer 134 for managing information on the movable assets. The server computer may comprise at least one processor or processing circuitry 30, and at least one memory 40 including computer program code 42. The memory further stores a database 44 comprising a record 46, 47, 48 for each asset associated with an asset tag in the system. As described above, the record may comprise an identifier of the asset tag and information on the asset or asset tag such as the location of the asset tag.

The server computer may further comprise a network adapter 42 or a similar communication circuitry enabling a network connection through which to communicate with the asset tags and the location tracking nodes in the above-described manner. The network adapter may comprise standard components required for communicating over one or multiple data networks, including internet protocol networks for example.

The processing circuitry may comprise an asset tracking module or circuitry 32 configured to acquire information on the assets and asset tags, as described above. The asset tracking module may receive, via the network adapter and the decentralized wireless network from an asset tag associated with an asset, payload data describing an asset. The payload data may include presence or inventory information of the asset, for example, or it may include sensor data. The asset tracking module may include a data processing unit 34 configured to process the received payload data and store the payload data in a record of the asset. The asset tracking module may further receive, from at least one location tracking node and via the network adapter 42, a message comprising an identifier of the asset tag and location tracking information on the asset tag. The asset tracking module may include a positioning unit configured to process such location tracking information and store, in the record of the asset, location data of the asset tag based on the location tracking information.

The processing circuitry 30 may further comprise an asset tag control module configured to control transmission timings of beacon signals transmitted by the asset tags, such that a number of simultaneous transmissions of the beacon signals is limited by said control amongst the asset tags.

Figure 11:
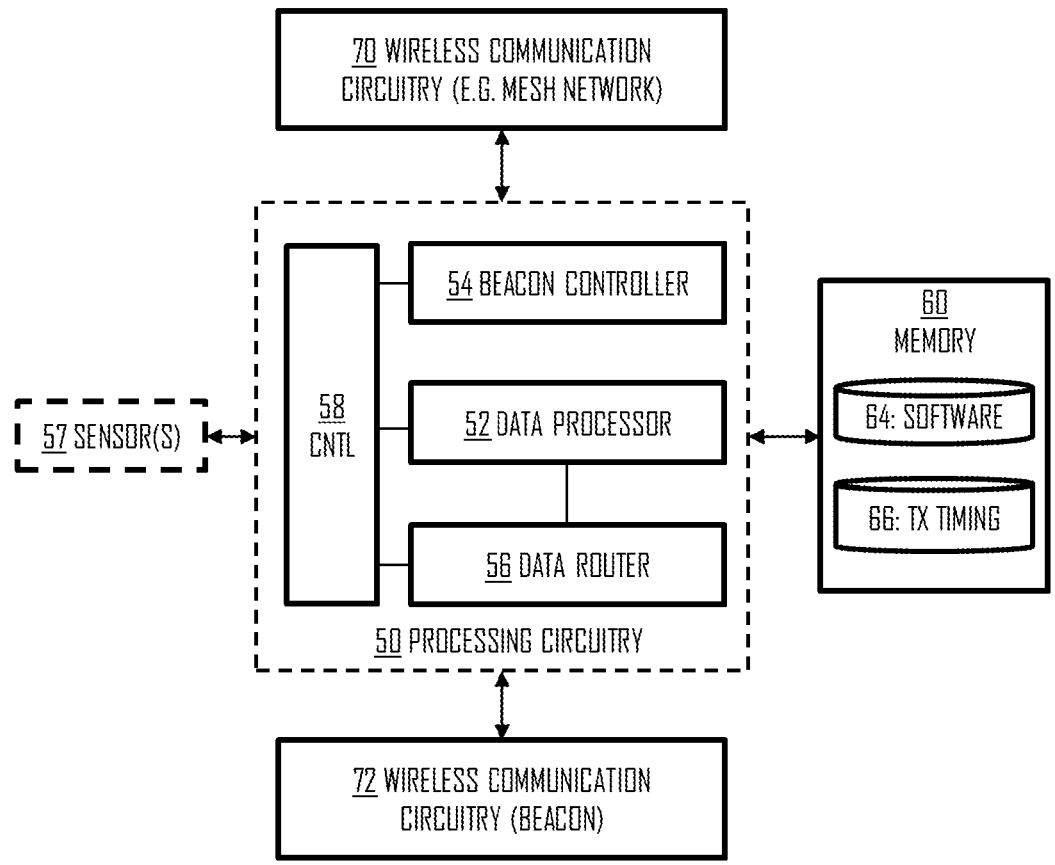

FIG. 11 illustrates a block diagram of an asset tag for a movable asset. The asset tag comprises a first wireless communication circuitry 70 configured to support the above-described first wireless communication protocol of the decentralized wireless network, and a second wireless communication circuitry 72 configured to support the second wireless communication protocol different from the first wireless communication protocol. As described above, the second wireless communication protocol may be suitable for the transmission of the beacon signals for positioning the asset tag. Examples of the protocols supported by the respective circuitries 70, 72 are described above.

The asset tag may comprise a memory 60 storing computer program code 64 defining the above-described operation and functions of the asset tag. The asset tag further comprises at least one processor or a processing circuitry 50 configured to: generate payload data describing the asset and to use the first wireless communication circuitry 70 to transmit the payload data via at least one other asset tag of the decentralized wireless network to the server computer 134, store in the memory a transmission timing rule (66) limiting transmission timings of beacon signals for positioning the asset tag, and use the second wireless communication circuitry 72 to transmit a beacon signal in accordance with the transmission timing rule. As described above, the transmission timing rule may be received from the server computer via the first wireless communication circuitry 70, or it may be preconfigured into the memory 60 during a manufacturing or programming stage of the asset tag before the asset tag has been taken into use for the first time. The transmission timing rule may define either the temporal parameters of the beacon signal transmissions, e.g. the beacon interval, or it may define that the beacon transmission is event-based and, optionally, the specifications of the event(s) that trigger(s) the transmission of the beacon signal. Examples of the events are described above.

The processing circuitry 50 may comprise a beacon controller 54 controlling the transmissions of the beacon signals. Upon activated, the beacon controller may control the wireless communication circuitry to transmit a determined number of beacon signals with the determined beacon intervals, as described above. In some embodiments, the beacon controller is continuously activated. In other embodiments, a controller 58 activates and deactivates the beacon controller according to the events, for example.

The processing circuitry 56 may further comprise a data router 56 configured to manage transmission and reception of data packets in the decentralized wireless network, i.e. via the first wireless communication circuitry 70. The data router may, for example, route a data packet received from one asset tag to another asset tag of the decentralized wireless network according to a packet routing policy applied in the network. The data router 56 may further extract data packets addressed to the asset tag and forward extracted contents of such data packets to the controller 58. The controller may then control the operation, e.g. store a new transmission timing rule in the memory 66 or control the beacon controller to transmit the beacon signal(s) upon receiving such a command from the server computer.

The asset tag may further comprise a sensor or sensors 57. The sensor(s) may comprise a motion sensor such as an accelerometer, gyroscope, strain gauge, or magnetometer. The sensor(s) may comprise a pressure sensor, humidity sensor, temperature sensor, carbon monoxide sensor, radio activity sensor, or any other type of sensor. The sensor(s) may be configured to measure a characteristic and to generate corresponding measurement data. The measurement data may be output to the processing circuitry 50 and, particularly to a data processor configured to process the measurement data and generate the payload data from the measurement data. In some embodiments, the measurement data may trigger the activation of the beacon controller 54. The payload data may then be transmitted via the wireless communication circuitry 70, as described above.

As used in this application, the term 'circuitry' refers to one or more of the following: (a) hardware-only circuit implementations such as implementations in only analog and/or digital circuitry; (b) combinations of circuits and software and/or firmware, such as (as applicable): (i) a combination of processor(s) or processor cores; or (ii) portions of processor(s)/software including digital signal processor(s), software, and at least one memory that work together to cause an apparatus to perform specific functions; and (c) circuits, such as a microprocessor(s) or a portion of a microprocessor(s), that require software or firmware for operation, even if the software or firmware is not physically present.

Embodiments described herein are applicable to wireless networks defined above but also to other wireless networks. The protocols used, the specifications of the wireless networks and their network elements develop rapidly. Such development may require extra changes to the described embodiments. Therefore, all words and expressions should be interpreted broadly and they are intended to illustrate, not to restrict, the embodiment. It will be obvious to a person skilled in the art that, as technology advances, the inventive concept can be implemented in various ways. Embodiments are not limited to the examples described above but may vary within the scope of the claims.

The invention claimed is:

1. An asset tag for a movable asset, comprising:
   a first wireless communication circuitry configured to support a first wireless communication protocol of a decentralized wireless network;
   a second wireless communication circuitry configured to support a second wireless communication protocol different from the first wireless communication protocol; and
   at least one processor configured to perform event-triggered beacon signal transmissions by:
   pairing the asset tag with a wireless device and acquiring an identifier of the wireless device during the pairing;
   as a result of the pairing, triggering transmission of one or more beacon signals via the second wireless communication circuitry to position the asset tag; and
   generating payload data comprising information on said pairing and using the first wireless communication circuitry to transmit the payload data via at least one other asset tag of the decentralized wireless network to a server computer.

2. The asset tag of claim 1, wherein the at least one processor is configured, as a result of the pairing, to generate the payload data comprising the identifier of the wireless device and to use the first wireless communication circuitry to transmit the identifier of the wireless device to the server computer.

3. The asset tag of claim 1, wherein the first wireless communication circuitry supports a mesh network protocol, and wherein the second wireless communication circuitry is configured to broadcast the beacon signal according to IEEE 802.15.1 specifications.

4. The asset tag of claim 1, wherein the event-triggered beacon signal transmissions are aperiodic.

5. The asset tag of claim 1, further comprising at least one sensor configured to measure a characteristic and to generate corresponding measurement data, and wherein the at least one processor is configured to perform said event-triggered beacon signal transmissions by detecting an event in the measurement data and, as a result of said detection, triggering said transmission of one or more beacon signals via the second wireless communication circuitry to position the asset tag.

6. The asset tag of claim 5, wherein the at least one sensor comprises a motion sensor, and wherein the event is motion of the asset tag.

7. The asset tag of claim 1, further comprising a third wireless communication circuitry configured to support a third wireless communication protocol different from the first and the second wireless communication protocol, and wherein the at least one processor is configured to perform the pairing by using the third wireless communication circuitry.

8. The asset tag of claim 1, wherein the at least one processor is configured to deactivate the beacon signal transmissions.

9. A server computer for managing information on movable assets, comprising:
   at least one processor; and
   at least one memory including computer program code, the at least one memory and computer program code configured to, with the at least one processor, cause the server computer to:
   store in the at least one memory a record for each asset,
   receive, from an asset tag associated with an asset and via a decentralized wireless network formed by asset tags including the asset tag, payload data comprising information on pairing conducted between the asset tag and a wireless device;

store the payload data in a record of at least one of the asset tag and the wireless device;

receive, from at least one location tracking node of a positioning infrastructure configured to track locations of the asset tags, a message comprising an identifier of the asset tag and location tracking information on the asset tag at the time of said pairing;

store, in the record of at least one of the asset tag and the wireless device, location data based on the location tracking information.

10. The server computer of claim 9, wherein the received payload data comprises an identifier of the wireless device, and wherein the at least one processor is further configured to combine the identifier received via the decentralized wireless network with the location data based on the location tracking information received from the at least one location tracking node.

11. The server computer of claim 9, wherein the at least one processor is configured to store the location data in the record of at least the wireless device.

* * * * *